Dec. 10, 1935.    P. D. HARVEY    2,023,585

REVERSE GEAR UNIT

Original Filed Jan. 5, 1931

Witness:
William P. Kilroy

Inventor:
Paul D. Harvey
By W. D. Bell, Atty.

Patented Dec. 10, 1935

2,023,585

UNITED STATES PATENT OFFICE 2,023,585

REVERSE GEAR UNIT

Paul D. Harvey, Chicago, Ill.

Original application January 5, 1931, Serial No. 506,774. Divided and this application February 20, 1935, Serial No. 7,365

5 Claims. (Cl. 74—355)

This application is a division of my application Serial No. 506,774, filed January 5, 1931.

This invention relates to reduction and reverse gear units of the kind particularly adapted for use in marine craft, such as motor boats, motor launches and the like that are propelled by internal combustion engines or similar motive power.

It has been the custom to provide low speed motive units in motor boats, motor launches and the like because high speed motive units drive the propellers or screws at excessively high speeds which are objectionable. The high speed, highly efficient internal combustion engines developed in the automotive art might be used advantageously in marine craft, because of their increased economy, but the speed of such an engine would need be reduced so that the propeller or screw of the craft in which it was used would not be driven at an excessive rate of speed, and one of the objects of this invention is to provide a novel speed reducing unit particularly adapted for marine craft to enable the use of a high speed engine therein.

It is often desirable to reverse the direction of rotation of the screw of a marine craft as, for example, when it is desired to stop the craft quickly. Moreover, reversibility also facilitates maneuvering of the craft. The pitch of a propeller or screw is customarily arranged for rotation in a forward direction and is not as efficient when operated in a reverse direction. It is therefore desirable to provide an efficient drive for operating a screw in a reverse direction. In view of the foregoing it is another object of my invention to provide a novel speed reducing unit which will afford efficient rotation in a reverse direction.

A further object is to provide a neutral position in a marine reduction and reverse gear unit so that the motive power may be disconnected from the propeller or screw.

Further objects are to provide a unit of the above described character wherein the various shafts are solidly journaled so that the unit will effectively resist wear and the life thereof will be prolonged and to maintain the various parts in proper relation to each other.

A still further object of the invention is to provide a marine reduction and reverse gear mechanism in a single unit of economical manufacture and simple construction and which will be compactly arranged.

Figure 1:
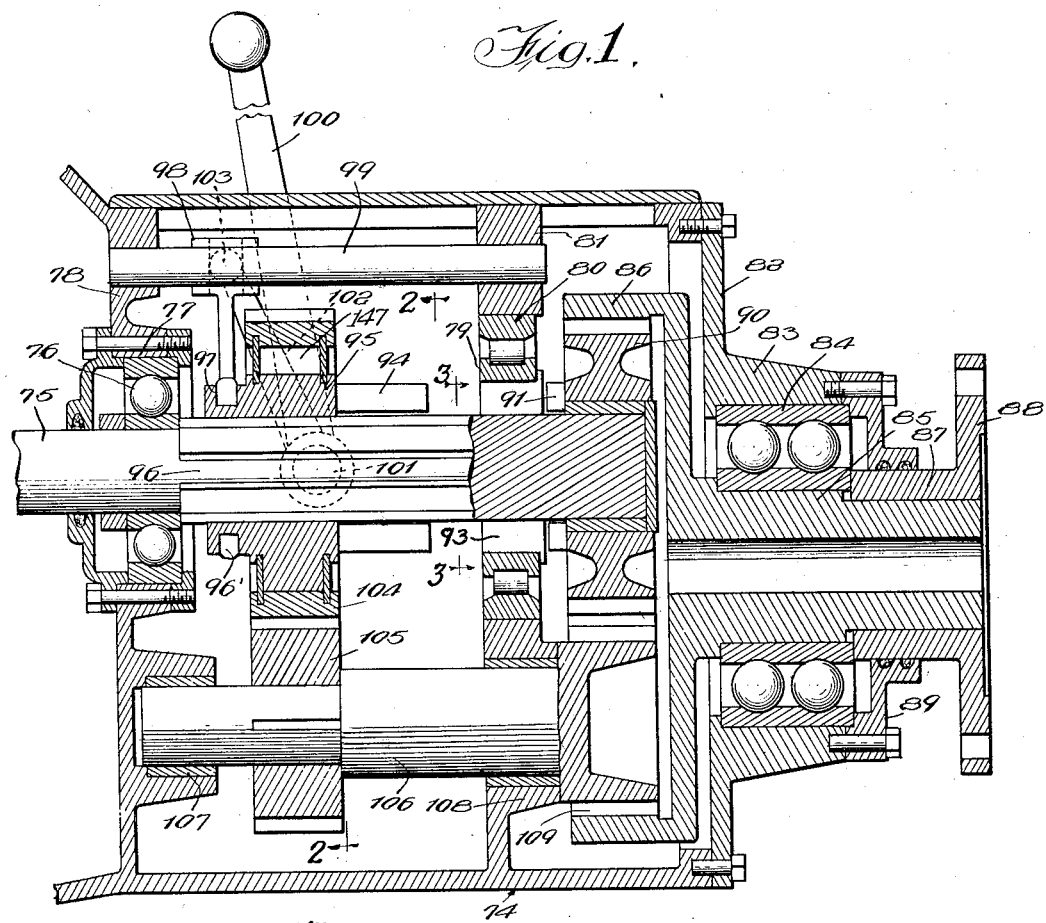
Figure 2:
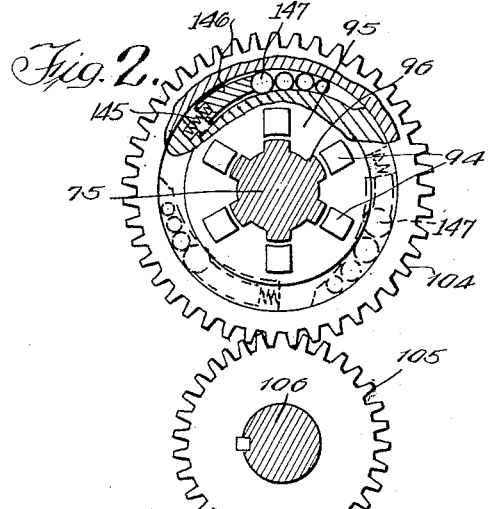
Figure 3:
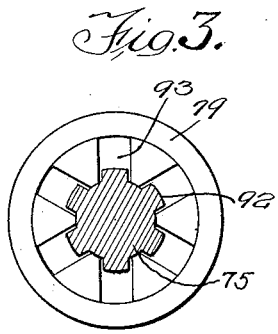

A selected embodiment of my invention is illustrated in the accompanying drawing wherein Fig. 1 is a longitudinal vertical sectional view of a marine reduction and reverse gear unit embodying my invention;

Fig. 2 is a transverse sectional detail view taken substantially on the line 2—2 on Fig. 1 and in which certain parts are broken away; and Fig. 3 is a transverse sectional detail view taken substantially on the line 3—3 on Fig. 1.

In the embodiment of my invention illustrated in the accompanying drawing, 74 indicates a casing in which the main drive shaft 75 is journaled. The shaft extends beyond the forward end of the casing to be connected to a suitable clutch structure or other source of power. The shaft 75 is journaled in an anti-friction bearing 76 mounted in a flanged opening 77 in the front wall 78 of the casing 74 and this shaft also passes through the inner race 79 of an anti-friction bearing 80 carried by the bracket 81 in the casing. The rear wall 82 of the casing 74 includes a sleeve 83 in which an anti-friction bearing 84 is mounted. The hub 85 of an internal gear 86 is journaled in the anti-friction bearing 84. The hub 85 extends beyond the bearing 84 and mounted thereon is the hub 87 of the flange coupling or power take-off device 88. A bearing retainer 89 is secured to the free end of the sleeve 83 and carries suitable packing glands which ride on the hub 87 and seal the housing 74 against leakage.

A spur gear 90 is rotatably mounted on the shaft 75 between the bracket 81 and the rear wall 82. A plurality of spaced apart lugs or teeth 91 having pockets therebetween are provided on the face of the spur gear 90 disposed toward the race 79 and provide clutch members. Splines 92 are provided in the shaft 75 and extend through the race 79. Clutch teeth 94 are movable through the keyways 93 in the inner race outwardly of and aligned with the keyways between the splines 92. The clutch teeth 94 are carried by a collar 95 slidably mounted on the splined portion 96 of the shaft 75. When the collar 95 is moved along the splined portion 96, the clutch teeth 94 pass through the keyways 93 and the forward ends of these clutch teeth pass into the pockets between the lugs 91 to thereby connect the gear 90 to the shaft 75. The gear 90 constantly meshes with the internal gear 86 and therefore when the gear 90 is connected to drive shaft 75 power is transmitted from the shaft 75 through the gear 90 to the internal gear 86 and therefore the hub 85 and the power take-off device 88 which is thereupon rotated in one direction.

The collar 95 is moved along the splined portion 96 by operation of a lever 100 that is pivotally mounted on the casing 74 at 101 and which is connected to an arm 102 that is pivotally connected at 103 to a bearing 98 slidable on a rod 99 extended between the bracket 81 and the front wall 78. The bearing 98 carries a yoke 96' which rides in a groove 97 in the collar 95. Thus by pivoting the handle 100 about the pivotal mounting 101 thereof the bearing 98 may be slid along the rod 99 to thereby move the clutch teeth 94 to and from engagement with the pockets between the lugs 91.

A gear 104 surrounds the collar 95 and is suitably connected thereto as by means of an overrunning clutch. Such an arrangement is shown in Fig. 2 wherein three tapered recesses are provided in the periphery of the collar 95 and rollers 147 of graduated size are mounted in these tapered recesses. Blocks 146 acted on by springs 145 are provided at the larger ends of the recesses and urge the rollers 147 toward the smaller ends of the recesses and when the rollers are in these ends of the recesses the gear 104 is clamped to the collar 95, and this occurs when the shaft 75 and therefore the collar 95 are rotated in one direction, and when this shaft and collar are rotated in the other direction the rollers move toward the larger ends of the recesses compressing the springs 145 and the gear 104 is disengaged from the collar 95. This overrunning clutch tends to absorb some of the shock incidental to reversing the direction of rotation of the hub 85. The gear 104 may be meshed with a pinion 105 fast on the countershaft 106 journaled in bearings 107 and 108 respectively provided in the front wall 78 and the bracket 81. The shaft 106 extends beyond the bearing 108 and a gear 109 is fast thereon which meshes with the internal gear 86.

When the lever 100 is operated to retract the keys 94 from the pockets between the lugs 91, the gear 90 is disconnected from the shaft 75 when the keys 94 are disengaged from these pockets and at this time the drive shaft 75 is disconnected from the power take-off device 88. However, further movement of the lever 100 in the direction which so disengages the keys 94 causes the gear 104 to mesh with the pinion 105 and therefore rotation of the drive shaft 75 is transmitted through the gear 104 to the pinion 105 and through the shaft 106 to the gear 109 and the internal gear 86 whereupon the hub 85 and the power take-off device 88 are rotated in the direction opposite to that in which these parts are rotated when the drive shaft 75 is connected to the gear 90. Therefore, meshing of the gear 104 with the pinion 105 affords an efficient reverse and the efficiency of this arrangement is increased by reason of the gear reduction afforded by the ratio of the gears in the gear train through which the rotation is transmitted.

It is therefore manifest that the unit not only provides a reversing arrangement but also a speed reversing arrangement. Furthermore the structure is compact and affords a neutral position, that is to say, when the lever 100 is manipulated to disengage the gear 104 from the pinion 105, and prior to the time the keys 94 engage in the pockets 91 the drive shaft 75 is disconnected from the power take-off device 88.

I wish it to be understood that I do not desire to be limited to the exact details of construction shown and described, for obvious modifications will occur to a person skilled in the art.

I claim:

1. In a marine reduction and reverse gear unit, a casing, an internal gear having a hub thereon journaled in said casing, said hub having power take-off means thereon externally of said casing, a drive shaft journaled in said casing, a pinion rotatably mounted on said drive shaft and meshed with said internal gear, a gear slidably and non-rotatably mounted on said drive shaft and having connecting means thereon for connecting the pinion on said drive shaft to said drive shaft, a countershaft journaled in said casing, a gear fast on said countershaft and meshed with said internal gear, a pinion fast on said countershaft and adapted to be meshed with the gear on said drive shaft, and means for sliding the gear on said drive shaft along said drive shaft to arrange the connecting means thereon to connect the pinion on said drive shaft to said drive shaft or to mesh the gear on the drive shaft with the pinion on the countershaft, said internal gear being driven in one direction when the pinion on the drive shaft is connected to the drive shaft and being driven in the other direction when the gear on the drive shaft is meshed with the pinion on the countershaft.

2. In a marine reduction and reverse gear unit, a casing, an internal gear at one end of said casing and journaled in one wall thereof and including a part providing a power take-off means located externally of said casing, a bracket in said casing, a drive shaft journaled in the other end of said casing and said bracket, a pinion rotatably mounted on said drive shaft adjacent said bracket and meshed with said internal gear, a gear slidably and non-rotatably mounted on said drive shaft and having means for connecting the pinion to the drive shaft, a countershaft journaled in said other end of said casing and said bracket, a gear fast on said countershaft adjacent said bracket and meshed with said internal gear, a pinion fast on said countershaft and adapted to be meshed with the gear on said drive shaft, and means slidably mounted in said casing and connected to the gear on said drive shaft for moving said gear along said drive shaft to connect the pinion on the drive shaft to the drive shaft or to mesh the gear on the drive shaft with the pinion on the countershaft, said internal gear being driven in one direction when the pinion on the drive shaft is connected to the drive shaft and being driven in the other direction when the gear on the drive shaft is meshed with the pinion on the countershaft.

3. In a marine reduction and reverse gear unit, a casing, an internal gear at one end of said casing and journaled in one wall thereof and including a part providing a power take-off means located externally of said casing, a bracket in said casing, a drive shaft journaled in the other end of said casing and said bracket, a pinion rotatably mounted on said drive shaft adjacent said bracket and meshed with said internal gear, a gear slidably and non-rotatably mounted on said drive shaft and having means for connecting the pinion to the drive shaft, a countershaft journaled in said other end of said casing and said bracket, a gear fast on said countershaft adjacent said bracket and meshed with said internal gear, a pinion fast on said countershaft and adapted to be meshed with the gear on said drive shaft, a rod journaled in said casing, a bearing slidable on said rod and carrying a yoke mounted in a groove in the gear on the drive shaft, and means for sliding said bearing along said rod to slide said gear along said drive shaft to connect the pinion on said drive shaft to said drive shaft or to mesh the gear on said drive shaft with the pinion on the countershaft, said internal gear being driven in one direction when the pinion on the drive shaft is connected to the drive shaft and being driven in the other direction when the gear on the drive shaft is meshed with the pinion on the countershaft.

4. In a marine reduction and reverse gear unit, a casing, an internal gear having a hub thereon journaled in said casing, said hub having power take-off means thereon externally of said casing, a bracket in said casing, a drive shaft journaled in said casing and said bracket, a pinion rotatably mounted on said drive shaft adjacent said bracket and meshed with said internal gear, said pinion having lugs on the face thereof disposed toward said bracket providing pockets therebetween, a gear slidably and non-rotatably mounted on said drive shaft, means on said drive shaft intermediate said gear and said pinion having axially extending openings therein, clutch teeth on said gear aligned with said axially extending openings to be movable therethrough to seat in the pockets on said pinion to thereby connect said pinion to said drive shaft, a countershaft journaled in said casing and said bracket, a gear fast on said countershaft adjacent said bracket and meshed with said internal gear, a pinion fast on said countershaft and adapted to be meshed with the gear on said drive shaft, means for sliding the gear on the drive shaft along said drive shaft to engage the clutch teeth in the pockets to connect the pinion on the drive shaft to the drive shaft or to mesh the gear on the drive shaft with the pinion on the countershaft or to mesh the gear on the drive shaft with the pinion on the countershaft, said internal gear being driven in one direction when the pinion on the drive shaft is connected to the drive shaft and being driven in the other direction when the gear on the drive shaft is meshed with the pinion on the countershaft.

5. In a marine reduction and reverse gear unit, a drive shaft, journals for said drive shaft, a pinion rotatably mounted on said drive shaft outwardly of one of said journals and having pockets in the side thereof adjacent said journal, a part on said shaft in one of said journals and having openings therein, a collar slidably and non-rotatably mounted on said drive shaft and including portions movable through said openings and engageable in the pockets in said pinion to connect said pinion to said drive shaft, a gear disposed about said collar and connected thereto, an internal gear meshed with the pinion on said drive shaft, a countershaft, journals for said countershaft, a pinion on said countershaft engageable with the gear connected to said collar, a gear on said countershaft meshed with said internal gear, and means for sliding said collar along said drive shaft to seat the portions thereon in the pockets in the pinion on the drive shaft to connect the pinion to the drive shaft or to mesh the gear connected to said collar with the pinion on the countershaft and thereby drive the countershaft or into a neutral position wherein the portions on said collar are disengaged from said pockets and the gear connected to said collar is out of mesh with the pinion on said countershaft, said internal gear being driven in one direction when the pinion on the drive shaft is connected to the drive shaft and in the other direction when the gear connected to the collar is meshed with the pinion on the countershaft, the internal gear not being driven when the portions on the collar are unseated from the pockets in the pinion on the drive shaft and when the gear connected to the collar is not meshed with the pinion on the countershaft.

PAUL D. HARVEY.